US008032091B2

(12) United States Patent
Harel et al.

(10) Patent No.: US 8,032,091 B2
(45) Date of Patent: Oct. 4, 2011

(54) METHOD, APPARATUS AND SYSTEM FOR PROVIDING TRANSMIT DIVERSITY FEEDBACK DURING SOFT HANDOFF

(75) Inventors: Haim Harel, New York, NY (US); Kenneth Kludt, Bedminster, NJ (US)

(73) Assignee: Magnolia Broadband Inc., Warren, NJ (US)

( * ) Notice: Subject to any disclaimer, the term of this patent is extended or adjusted under 35 U.S.C. 154(b) by 827 days.

(21) Appl. No.: 12/043,256

(22) Filed: Mar. 6, 2008

(65) Prior Publication Data

US 2008/0227472 A1 Sep. 18, 2008

Related U.S. Application Data

(60) Provisional application No. 60/906,829, filed on Mar. 14, 2007.

(51) Int. Cl.
*H04B 7/02* (2006.01)
*H04W 36/00* (2009.01)
(52) U.S. Cl. ............... 455/101; 455/442; 455/67.11
(58) Field of Classification Search ............ 455/101, 455/522, 91, 517, 226.1, 226.2, 226.3, 67.11, 455/67.13, 436, 442
See application file for complete search history.

(56) References Cited

U.S. PATENT DOCUMENTS

| | | | |
|---|---|---|---|
| 5,539,728 A * | 7/1996 | Gaiani et al. ............... | 370/342 |
| 5,642,353 A | 6/1997 | Roy, III et al. | |
| 5,832,044 A | 11/1998 | Sousa et al. | |
| 5,839,056 A * | 11/1998 | Hakkinen .................. | 455/69 |
| 5,940,452 A * | 8/1999 | Rich ............................ | 375/347 |
| 5,991,330 A | 11/1999 | Dahlman et al. | |
| 5,999,826 A | 12/1999 | Whinnett | |
| 6,104,933 A * | 8/2000 | Frodigh et al. ............... | 455/522 |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |
| 6,492,942 B1 | 12/2002 | Kezys | |
| 6,636,495 B1 | 10/2003 | Tangemann | |
| 6,704,370 B1 | 3/2004 | Chheda et al. | |
| 6,745,009 B2 | 6/2004 | Raghothaman | |
| 6,810,264 B1 | 10/2004 | Park et al. | |

(Continued)

FOREIGN PATENT DOCUMENTS

EP 0 986 193 3/2000

(Continued)

OTHER PUBLICATIONS

International Preliminary Examination Report of Application No. PCT/US2008/057108 dated Sep. 24, 2009.

(Continued)

*Primary Examiner* — Sonny Trinh
(74) *Attorney, Agent, or Firm* — Pearl Cohen Zedek Latzer, LLP

(57) ABSTRACT

Embodiments of the present invention describe methods for increasing the amount of information available to a mobile transmit diversity transmitter during soft handoff. According to embodiments of the invention, a transmit diversity transmitter may determine substantially when it is within the range of at least two receivers. In such situations, the transmitter may use the power control signals from more than one receiver, for example, from the two most dominant receivers in order to focus the beamforming accordingly.

18 Claims, 3 Drawing Sheets

U.S. PATENT DOCUMENTS

| | | | |
|---|---|---|---|
| 6,859,643 B1 | 2/2005 | Ma et al. | |
| 6,882,228 B2 | 4/2005 | Rofougaran | |
| 7,319,868 B2 * | 1/2008 | Lindoff | 455/422.1 |
| 7,486,931 B2 * | 2/2009 | Cho et al. | 455/39 |
| 7,809,330 B2 * | 10/2010 | Cho et al. | 455/39 |
| 7,945,222 B2 * | 5/2011 | Harel et al. | 455/101 |
| 2003/0002594 A1 | 1/2003 | Harel et al. | |
| 2003/0112880 A1 | 6/2003 | Walton et al. | |
| 2004/0048584 A1 | 3/2004 | Vaidyanathan et al. | |
| 2004/0085239 A1 | 5/2004 | Ukena et al. | |
| 2005/0059355 A1 | 3/2005 | Liu | |
| 2005/0143113 A1 | 6/2005 | Lee et al. | |
| 2006/0068791 A1 | 3/2006 | Lindoff | |
| 2007/0117326 A1 | 5/2007 | Tan et al. | |

FOREIGN PATENT DOCUMENTS

| | | |
|---|---|---|
| EP | 1 204 219 | 5/2002 |
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |
| WO | WO 2007/117326 | 10/2007 |

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

International Search Report for International Application No. PCT/US2008/057108 mailed Aug. 28, 2008.

* cited by examiner

METHOD, APPARATUS AND SYSTEM FOR PROVIDING TRANSMIT DIVERSITY FEEDBACK DURING SOFT HANDOFF

CROSS-REFERENCE TO RELATED APPLICATIONS

This application claims benefit of U.S. Provisional Patent Application Ser. No. 60/906,829, entitled "Method, Apparatus and System for Providing Transmit Diversity Feedback During Soft Handoff" and filed Mar. 14, 2007, the entirety of which is incorporated by reference herein.

FIELD OF THE INVENTION

This invention relates generally to the field of wireless communications and more specifically to controlling transmit diversity parameters in a mobile communication device in a vicinity of more than one base station.

BACKGROUND OF THE INVENTION

A mobile or modifying communication device may have multiple antenna elements that transmit signals to communicate information. A base station or feedback communication device may extract information from the transmitted signals. Multiple antenna elements may enhance spatial or spectral efficiency, allowing for more users to be simultaneously served over a given frequency band. The transmitted signals, however, propagate along different paths and may reach the receiving communication device with different phases that destructively interfere. It is generally desirable to reduce interference of transmitted signals.

US Patent Publication No. 2003/0002594, assigned to the assignee of the present application, the contents of which are hereby incorporated herein by reference, describes using a power control signal, for example, as provided by the power control bit of the CDMA protocol, as a quality indication signal.

SUMMARY OF EMBODIMENTS OF THE INVENTION

Embodiments of the present invention may improve performance of a mobile transmit diversity communication device during soft handoff situations. For example, imperfections may occur when the transmitter attempts to form or focus a single beam toward two differently located receivers, thus achieving suboptimal solution for both locations. In some embodiments of the invention, the method, system and apparatus described in US Patent Publication No. 2003/0002594 may be improved, supplemented or replaced by those describe herein. Embodiments of the present invention may operate to focus beam-forming at two or more base station receivers based on feedback received from such two or more feedback sources.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
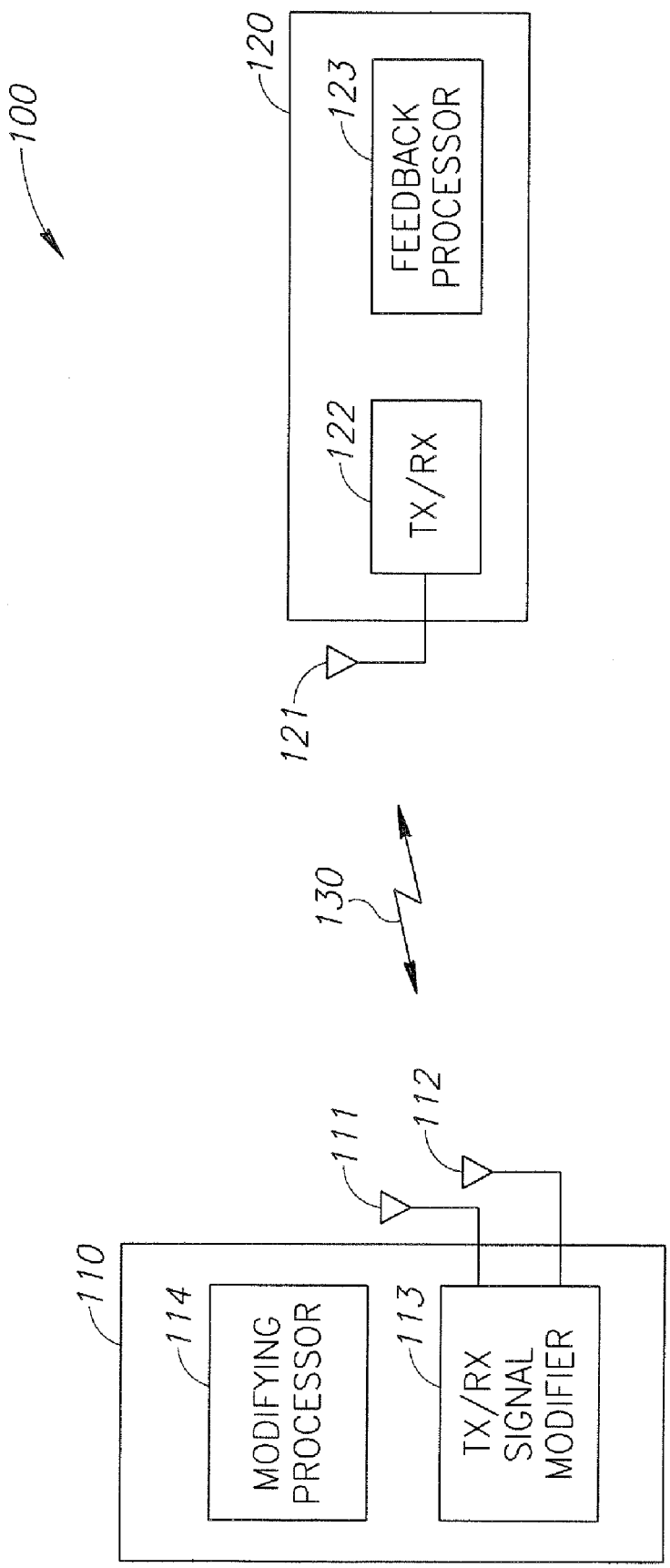
FIG. 1 is a block diagram illustrating one embodiment of a communication system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

FIG. 1 is a block diagram illustrating one embodiment of a communication system 100 that includes a mobile transmitter 110, also referred to as a modifying communication device, that that adjusts a nominal value of a transmit diversity parameter, for example, a phase difference and/or a power ratio between a signal transmitted on a first antenna 111 and a second antenna 112. Although the embodiments described in the present application are described as using two antennas, it will be recognized that the present invention is equally applicable to transmit diversity systems and devices having more than two antennas.

According to the embodiment, transmitter may, for example, perturb a signal at a perturbation rate and transmit the signal to receiving communication device 120, also referred to as a feedback communication device. Feedback communication device 120 may receive the transmit diversity signal at antenna 121 and transmit/receive module 122, process the received signal using processor 123, and transmit feedback information that describes the signal quality as received by feedback communication device 120. It will be recognized that there may be a variety of ways for the feedback device to provide this signal quality indication. In one embodiment described herein, the power control bit (PCB) may be used as a signal quality indicator. In other embodiments one ore more feedback parameters, including antenna selection and/or dedicated transmit diversity feedback parameters, may be used additionally or alternatively. Modifying communication device 110 may adjust a nominal value of at least one transmit diversity parameter at a nominal value adjustment rate based on the feedback information.

According to the illustrated embodiment, network 100 operates to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

Network 100 may utilize communication protocols and technologies to provide the communication sessions.

Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Devices of network 100 may use any suitable multiple access technology, for example, a code division multiple access (CDMA) technology. According to one embodiment, network 10 may operate according to a CDMA 2000 telecommunications technology that uses a single CDMA channel. As an example, a CDMA 2000 high rate data packet technology, such as the Evolution Data Only (EvDO) technology may be used.

Network 100 may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireless network, a local, regional, or global communication network, an enterprise intranet, other suitable communication link, or any combination of the preceding.

A component of network 100 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

Communication network 100 may include one or more modifying communication devices 110 and one or more feedback communication devices 120 that communicate via a wireless link 130. Either or both of communication devices 110 and 120 may be any device operable to communicate information via signals with one or more other communication devices. For example, either of communication devices 110 or 120 may comprise a mobile subscriber unit or a base station. A subscriber unit may comprise any device operable to communicate with a base station, for example, a personal digital assistant, a cellular telephone, a mobile handset, a computer, or any other device suitable for communicating signals to and from a base station. A subscriber unit may support, for example, Session Initiation Protocol (SIP), Internet Protocol (IP), or any other suitable communication protocol.

A base station may provide a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

In some embodiments of the invention, the feedback communication device 120 may be a base station, and the modifying communication device 110 may be a subscriber unit.

Either or both of communication devices 110 or 120 may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

A communication link between communication devices 110 and 120 such as wireless link 130 may be a radio frequency link that is cellular in network organization. Wireless link 130 may be used to communicate a signal between communication devices 120 and 110.

As described more fully below, according to embodiments of the present invention, modifying communication device 110 may include a processor 114 and a transmit/receive module 113 that calculate and produce one or more signals for transmission over at least first and second antennas 110 and 112.

Feedback communication device 120 may include a processor 123 and transmit/receive module 122 that generate and transmit a feedback signal that indicates the quality of the modified signal as received at the feedback communication device 120. Modifying communication device 110 may then modify the transmit signal in accordance with feedback information corresponding to the feedback signal.

According to one embodiment, modifying a signal may refer to modifying a signal feature. A transmission signal feature, or in some embodiments of the invention, a transmit diversity parameter, may refer without limitation to any feature of the transmission, for example, relative phase, relative amplitude, relative power, absolute power, frequency, timing, other suitable signal feature that may be modulated, or any combination of the preceding. Relative phase may refer to the phase difference between the phase of a first signal of a first transmit antenna element and the phase of a second signal of a second transmit antenna element. Relative power may refer to the ratio between the power of a first signal of a first transmit antenna element and the power of a second signal of a second transmit antenna element, which ratio may be defined on a linear or logarithmic scale. Relative amplitude may refer to the ratio between the amplitude of a first signal of a first transmit antenna element and the amplitude of a second signal of a second transmit antenna element. Absolute power may refer to the total power transmitted by all antennas of modifying communication device 110. According to one embodiment, modifying a signal may be described as adjusting a nominal value of a transmit diversity parameter. As described more fully herein, according to an embodiment of the invention, modulation of a transmit diversity parameter during a perturbation cycle may comprise transmitting using a transmit diversity parameter deviating from the nominal value in a first direction during a first portion of the perturbation cycle and then transmitting using a transmit diversity parameter deviating from the nominal value in a second direction during a second portion of the perturbation cycle.

According to one embodiment of operation of the invention, modifying communication device 110 may modify a signal by perturbing the signal. Perturbing a signal may refer to modulating a signal feature of the signal in relation to a nominal value of the signal, for example, modifying the signal feature in a first direction for a first feedback interval, and in a second direction for another feedback interval. A perturbation cycle may refer to a first modulation in a first direction and a second modulation in a second direction. In some embodiments of the invention, a perturbation cycle may comprise a different, e.g., longer or more complex, sequence of modulations. As an example with respect to phase, a perturbation may include modulating the phase difference in a first direction, and modulating the phase difference in a second direction. If the feedback information provided by the feedback communication device 120 indicates an improvement in the signal received using one perturbation modulation direction compared to the signal received using the other perturbation modulation direction, the next nominal value adjustment may be made in the improved direction in an amount less than or equal to the modulation.

According to embodiments of the invention, the nominal value of a transmit diversity parameter may be perturbed at a first rate, designated the perturbation rate, and the nominal value of the transmit diversity parameter may be adjusted at a second rate, designated the nominal value adjustment rate. The perturbation rate and the nominal value adjustment rates may be the substantially the same or they may be different, and each one may be substantially the same or different than the feedback rate.

In an embodiment of the present invention, feedback communication device 120 may transmit to modifying communication device 110 a power control signal, for example, one or more power control bits, or any type or group of power control signals may be used. A power control signal may indicate to the modifying communication device 110 that it should raise or lower its power. For example, based on the parameter being modulated, a "quality up" outcome value may instruct modifying communication device 110 to increase the total power of its transmitted signal, and a "quality down" outcome value may instruct modifying communication device 110 to decrease the total power. An outcome value may comprise, for example, a power control bit of a CDMA power control signal, for which "0" represents a command to increase power and a "1" represents a command to decrease power. Thus, for example, a bit value of "1" requesting a decrease in power may indicate "quality up," and a bit value of "0" requesting an increase in power may indicate "quality down." Some CDMA or W-CDMA protocols may allow for additional outcomes, for example, no change in power.

A transmitter may simultaneously receive power control signals from multiple receivers, for example, when the transmitter is a mobile device within range of a plurality of base stations. This is typically referred to as a soft handoff situation. These power control signals may provide the transmitter with conflicting instructions, e.g., one base station may indicate "quality up" and another may indicate "quality down." However, the transmitter may only respond to one of the conflicting instructions. The transmitter decision is therefore based on the aggregate power control signal, which may indicate "quality up" if at least one received power control signal is a "quality up" and otherwise "quality down". For example, the aggregate power control signal may be implemented as the logical OR value of all received power control signals. That is, if all received power control signals indicate "0", then all have received a degraded signal and are requesting increase in power, and accordingly, the aggregate power control signal will be "0" and the transmitter will increase power. In another case, if at least one power control signal indicates "1", then at least one base station has received an improved signal and is requesting decrease in power, and accordingly, the aggregate power control signal will be "1" and the transmitter will decrease increase power.

According to embodiments of the present invention, transmit diversity transmitters may obtain feedback information from multiple power control signals, whether alone or in addition to other feedback signals and parameters.

In one embodiment of the invention, the transmitter may first ascertain that it is substantially within the range of more than one receiver providing a meaningful power control signal. In some embodiments of the invention, the determination that the transmitter is in soft handoff may be made statistically over a number of power control signals received over a test period, for example, 100 ms. For example, the transmitter may enter soft handoff mode when at least two power control signal streams during the test period each include a number of "quality down" signals greater than a threshold value. The threshold value may be defined in relative or absolute terms. For example, the threshold condition for soft handoff mode may require that more than 25% of power control signals received from each of at least two feedback sources be "quality down". In another embodiment, the threshold may be at least 30%, 40% or 50%. In an embodiment of the invention, the threshold may be defined in comparative terms, for example, when the number of "quality down" signals from two feedback sources are approximately equal, for example, when their number of "quality down" signals for a test period are within no more than approximately 10%, 20%, or 30% of each other. It will be recognized that other determinations may be made for establishing a soft handoff situation, depending, for example, on whether the beamforming is to be focused more strongly at the weaker base station or at the more dominant base station.

It will be understood in the context of the present application, that the determination made by the mobile transmitter that it is in a soft handoff situation is merely shorthand for a situation in which the device is within range of receiving meaningful feedback from more than one base station. It is possible within the scope of the present invention that a transmitter may determine that it is in a soft handoff situation and proceed accordingly even when service is not actually being handed off from one base station to another, for example, when the mobile transmitter is stationary and equidistant (power-wise) from two base stations, in which case service may not be handed off, but the device may operate in soft handoff mode. For example, a soft handoff algorithm may include a hysteresis component in order to avoid excessive handoffs. In such a system, even though the soft handoff is not actually performed, the presence of at least two meaningful base station signals may be used in connection with the present invention.

When a determination is made that the transmitter is in soft handoff, it may regard each of the power control signals as an individual feedback stream, and direct its beamforming to both receivers.

Figure 2:
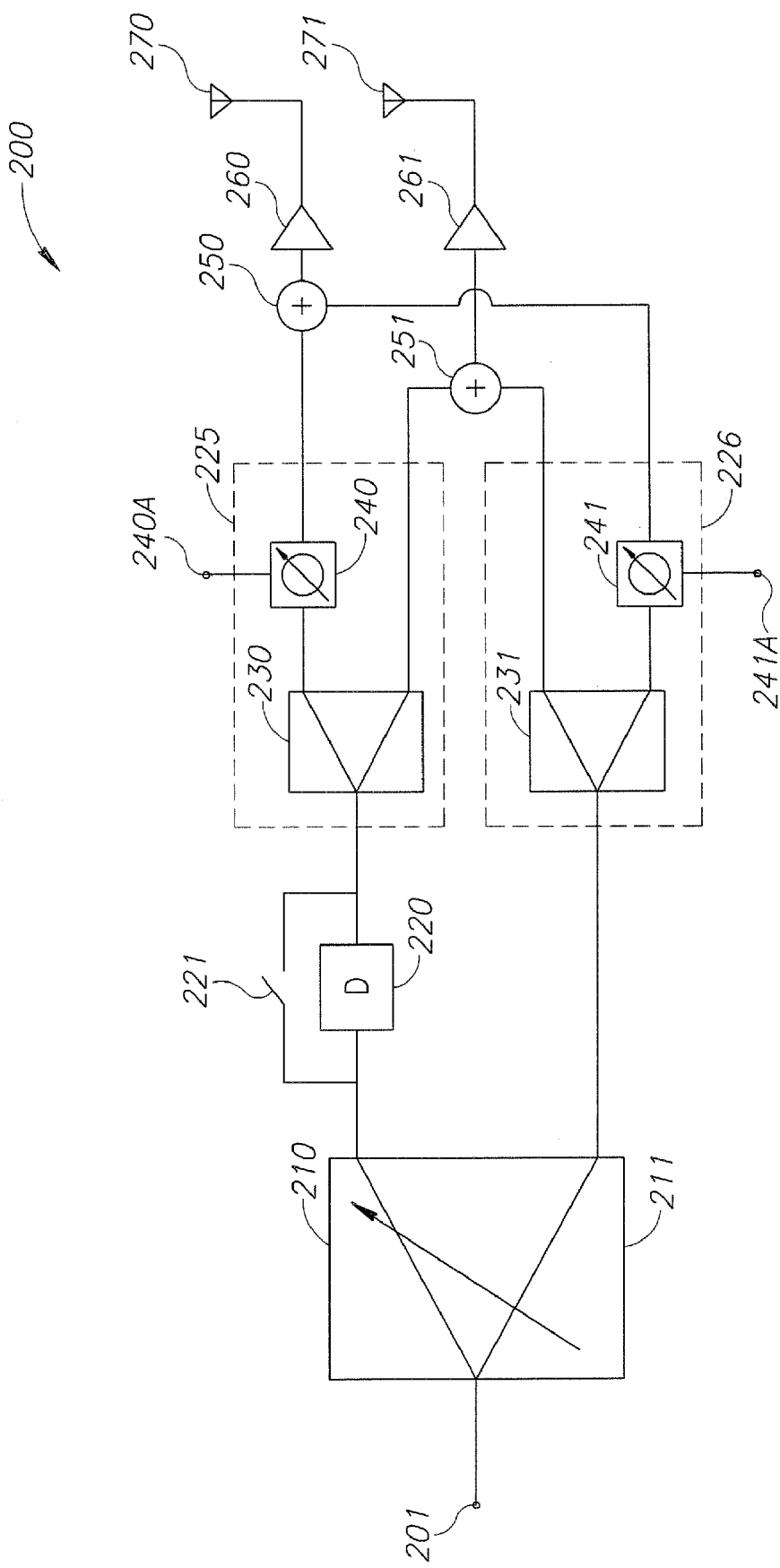
FIG. 2 is a schematic diagram of a device according to embodiments of the present invention, in which the transmitter may have at least two transmit paths each controlled by respective independent diversity parameters.

FIG. 2 depicts a device 200 according to embodiments of the invention, in which the transmitter may have at least two transmit paths each controlled by respective independent diversity parameters. A signal for transmission may be received at input 201. The power of the signal may be divided at power divider 210. In one embodiment of the invention, the power divider may optionally be a variable power divider, wherein the proportions of the power dividing may be controlled by input signal 211, which may provide a relative strength of a signal to be transmitted over one set of antennas or the other. For example, for an input signal 211 of 50%, half of the signal power will be diverted each of the outputs of power splitter 210. The determination of how much power should go to each of the outputs may be based on a statistical analysis of the received feedback signals, e.g., power control signals. As described above, in one embodiment of the invention, the transmitter may ascertain that it is in soft handoff based on the number of "quality down" signals in a test period. The input to power splitter 210 may be proportional to the results of the results of the test period analysis. For example, if in the soft handoff determination, it is ascertained that one feedback source, e.g., a base station, produces 30% "quality down" power control signals, and another feedback source produces 60% "quality down" power control signals, then the input to power divider 210 may be ⅓, i.e., 30/(30+60) to one output and ⅔, i.e., 60/(30+60) to the other. It will be recognized that in implementations of the invention, for example, where input signal 211 is a digital signal, there may be rounding effects due to quantization. Algorithms for producing input signal 211 based on the feedback signal are not described in detail herein, however, any number of mobile transmit diversity algorithms may be used. Similarly, the sub-system for producing the input signal 211 is not described, however, it may be a processor, a memory, or any suitable sub-system.

Each of the outputs of power divider 210 may then be treated with a different diversity control parameter based on a respective power control signal. Thus, in the example above, where the first and second power control signals have 30% and 60% "quality down" values, respectively, the output branch receiving ⅓ of the power may be controlled based on the signal providing the 30% "quality down" signals, and the output branch receiving ⅔ of the power may be controlled based on the signal providing the 60% "quality down" signals.

It will be understood that in order to simplify decorrelating the signals at the receiver, one of modules 225 and 226 may have a delay introduced thereto, for example, by delay element 220. In an embodiment of the invention, the delay introduced may be at least one chip. Other embodiments may employ other methods for decorrelating the signals, for example, by transmitting using three antennas, for example, where one primary antenna may be driven with a half-power amplifier, and the second and third antennas may be driven using quarter-power amplifiers. Other fractional power amplifiers may be used, for example, each antenna may be driven using a one-third-power amplifier.

The signal carried on each output branch of power divider 210 may be treated separately. For example, each power-divided signal may be provided to modules 225 and 226, respectively for processing. Module 225 may include, for example, power splitter 230, and phase shifter 240. Power splitter 230 may split the signal into first and second transmit branches. Phase shifter 240 may produce a phase shift on one of the branches controlled by input 240A. Similarly, module 226 may include, for example, power splitter 231, and phase shifter 241. Power splitter 231 may split the signal into first and second transmit branches. Phase shifter 241 may produce a phase shift on one of the branches controlled by input 241A. It will be recognized that during soft handoff, phase shifter control inputs 240A and 241A may be derived separately from each of the two power control feedback signals, respectively. It will be understood that there are a variety of methods and algorithms for controlling a diversity parameter based on a power control signal, as described by other patent applications of the present assignee.

After producing the two diversity signals by each of modules 225 and 226, the signals may be combined by adders 250 and 251, amplified by power amplifiers 260 and 261, and transmitted on antenna elements 270 and 271, respectively. It will be understood that in some embodiments of the invention, it may be advantageous to place power amplifiers additionally or alternatively before the adding elements.

In some embodiments of the invention, when not in soft handoff mode, a transmitter may operate based on the aggregate power control signal, or according to a single most dominant power control signal. It will be evident that this aspect of the invention may be implemented in any number of ways. In an embodiment of the invention, for example, where the power divider 210 is a variable power divider, when not in handoff mode, the input to the variable power divider may be set to provide 100% of power to a single operating branch of the circuit of FIG. 2, for example, the branch lacking the delay element. In another embodiment, when not in soft handoff mode, the delay element 220 may be bypassed by switch 221, and the phase shifting elements 240 and 241 may be set to receive the same input values, based on the aggregate power control signal, or according to a single most dominant power control signal.

Figure 3:
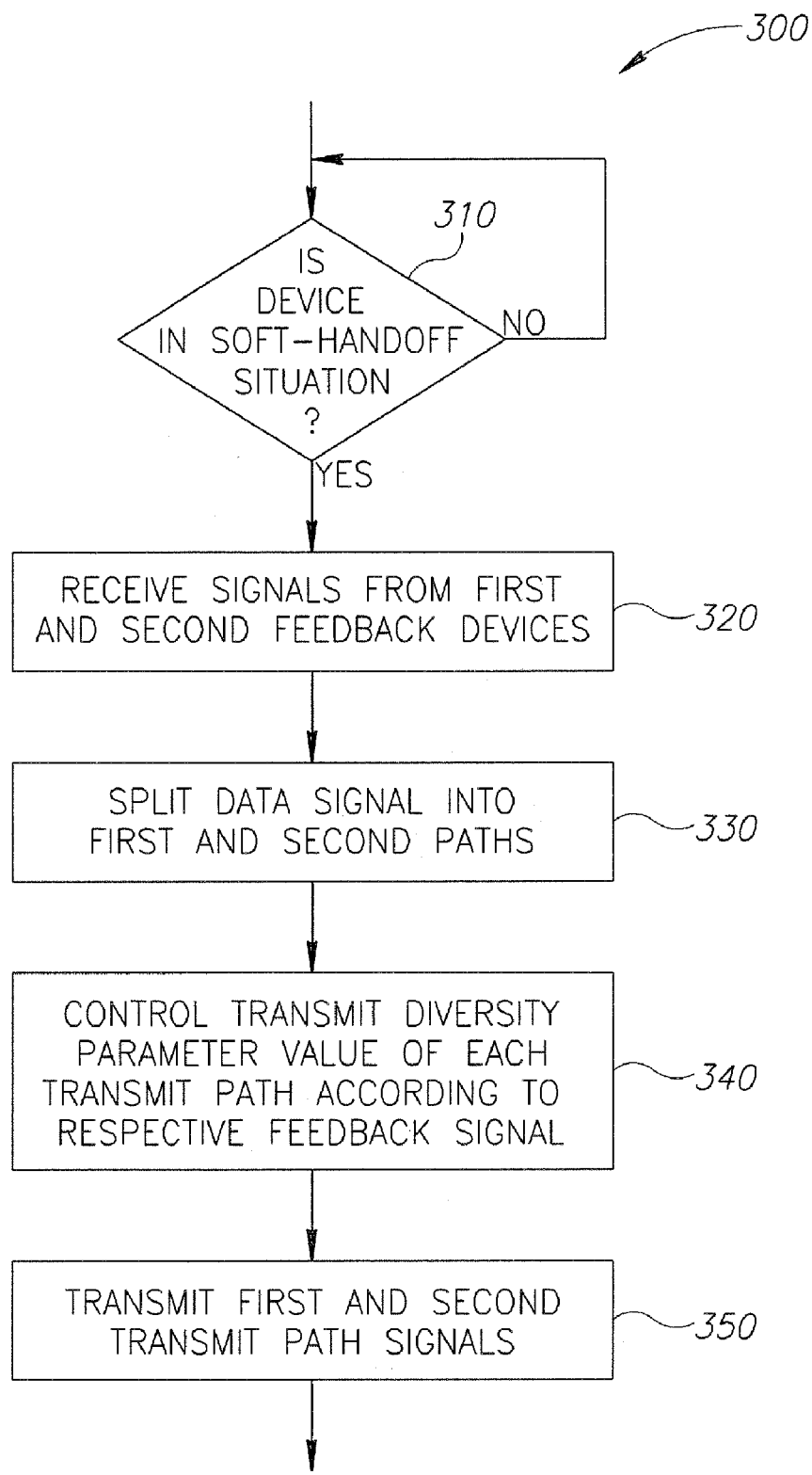
FIG. 3 is a schematic flow diagram of a method according to an embodiment of the present invention.

Reference is made to FIG. 3, which is a schematic flow diagram of a method 300 according to an embodiment of the present invention. A determination may be made whether the mobile device is in a soft-handoff situation, e.g., whether it is in the vicinity of two usable feedback signals (310). This determination may be made according to any of the calculations discussed above, or any suitable technique for determining whether feedback signals from two feedback communication devices may be used. If the device is in a soft-handoff situation, then the device may receive signals from first and second feedback devices (320). A data signal is split into first and second transmit paths (330). A value of a transmit diversity parameter may be controlled for each transmit path based on a feedback signal from a respective feedback device (340). The first and second transmit path signals may be transmitted (350). It will be recognized that additional steps may be added, for example, adding a transmit delay, or, for example, recombining transmit paths as described above.

Certain embodiments of the invention may include none, some, or all of the above technical advantages. One or more other technical advantages may be readily apparent to one skilled in the art from the figures, descriptions, and claims included herein.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention. For example, any mobile communication protocol may be used, for example, CDMA or other types of protocols. For example, the communication devices similar to those described above can be used with time-division multiple access (TDMA) or frequency-division multiple access (FDMA) protocols. Such a TDMA protocol can include, for example, the Global Systems for Mobile Communications (GSM) protocol.

Note that although the tuning of a communication device is described through the use complex weighting, in other embodiments other types of control signals can tune the communication device. In other words, the tuning of a communication device through the use such control signals need not be limited to information about varying the magnitude and phase of the signal. For example, the control signals can carry information to vary the magnitude, phase, frequency and/or timing of the signal associated with each antenna element.

Embodiments of this invention may apply to any transmit diversity control method. It will be understood that the methods discussed herein may be integrated with any transmit diversity control algorithm. It will further be understood that the present invention may be implemented as a stand-alone processing module, or may be integrated into a transmit diversity control processor, algorithm, or signal path circuitry.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of controlling a mobile communication device comprising:
   determining by a mobile communication device that it is a vicinity of first and second usable feedback signals transmitted by respective first and second base stations;
   splitting a data signal into at least first and second transmit paths of the mobile communication device;
   controlling a value of a transmit diversity parameter for each of said first and second transmit paths based on respective usable feedback signals; and
   transmitting signals from said first and second transmit paths using first and second antennas of the mobile communication device.

2. The method of claim 1, wherein determining that the mobile communication device is a vicinity of first and second usable feedback signals comprises receiving a signal from said first and second base stations during a predetermined period of time requesting that the mobile communication device reduce transmission power.

3. The method of claim 2, wherein splitting the data signal comprises varying a power ratio between the first and second transmit paths based on a comparison of the first and second usable feedback signals.

4. The method of claim 3, wherein the comparison of the first and second usable feedback signals is a comparison of the number of signals received from the first base station and the second base station requesting that the mobile communication device reduce transmission power.

5. The method of claim 1, further comprising adding a delay in one of said first and second transmit paths.

6. The method of claim 5, further comprising selectively adding said delay based on determining that the mobile communication device is the vicinity of said first and second usable feedback signals.

7. The method of claim 1, wherein the transmit diversity parameter in each of said first and second transmit paths is a phase difference.

8. The method of claim 7, wherein controlling a value of the transmit diversity parameter for each of said first and second transmit paths comprises for each of said first and second paths:
   calculating based on one of said usable signals a phase difference value,
   splitting the transmit path into first and second transmit branches, and
   producing said phase difference value in said first transmit branch relative to said second transmit branch.

9. The method of claim 8, wherein transmitting signals from said first and second transmit paths comprises:
   transmitting on the first antenna a first combined signal based on the first transmit branches of the first and second transmit paths; and
   transmitting on the second antenna a second combined signal based on the second transmit branches of the first and second transmit paths.

10. A mobile communication apparatus comprising:
    a processor to:
        determine that the mobile communication apparatus is a vicinity of first and second usable feedback signals transmitted by respective first and second base stations, and
        produce first and second control signals based on said first and second usable feedback signals, respectively;
    a splitter to split a data signal into first and second transmit paths of the mobile communication apparatus;
    first and second transmit diversity control units to respectively produce first and second values of a transmit diversity parameter with respect to first and second transmit paths based on first and second control signals;
    first and second antennas associated with the mobile communication apparatus to transmit signals from said first and second transmit paths.

11. The apparatus of claim 10, wherein said processor is to determine that the mobile communication apparatus is a vicinity of said first and second usable feedback signals by receiving a signal from first and second base stations during a predetermined period of time requesting that the mobile communication apparatus reduce transmission power.

12. The apparatus of claim 11, wherein said splitter is a variable splitter, and wherein said variable splitter is to vary a power ratio between the first and second transmit paths based on a comparison of the first and second usable feedback signals.

13. The apparatus of claim 12, wherein the comparison of the first and second usable feedback signals is a comparison of the number of signals received from the first base station and the second base station requesting that the mobile communication device reduce transmission power.

14. The apparatus of claim 10, further comprising a delay unit to add a delay in one of said first and second transmit paths.

15. The apparatus of claim 14, further comprising a bypass switch to selectively connect said delay unit into said transmit path based on determining that the mobile communication device is the vicinity of said first and second usable feedback signals.

16. The apparatus of claim 10, wherein the transmit diversity parameter in each of said first and second transmit paths is a phase difference.

17. The apparatus of claim 16, wherein said first and second control signals represent first and second phase difference values, respectively, the apparatus further comprising in each of said first and second transmit paths a power splitter to split the transmit path into first and second transmit branches, and a phase adjuster in one of said first and second transmit branches, wherein said phase adjusters are controlled by respective phase difference values.

18. The apparatus of claim 17, further comprising first and second combiners to respectively combine the first transmit branches of first and second transmit paths and the second transmit branches of first and second transmit paths, wherein the result of the first combiner is provided to said first antenna for transmission thereon, and the result of the second combiner is provided to said second antenna for transmission thereon.

* * * * *